Patented Feb. 9, 1926.

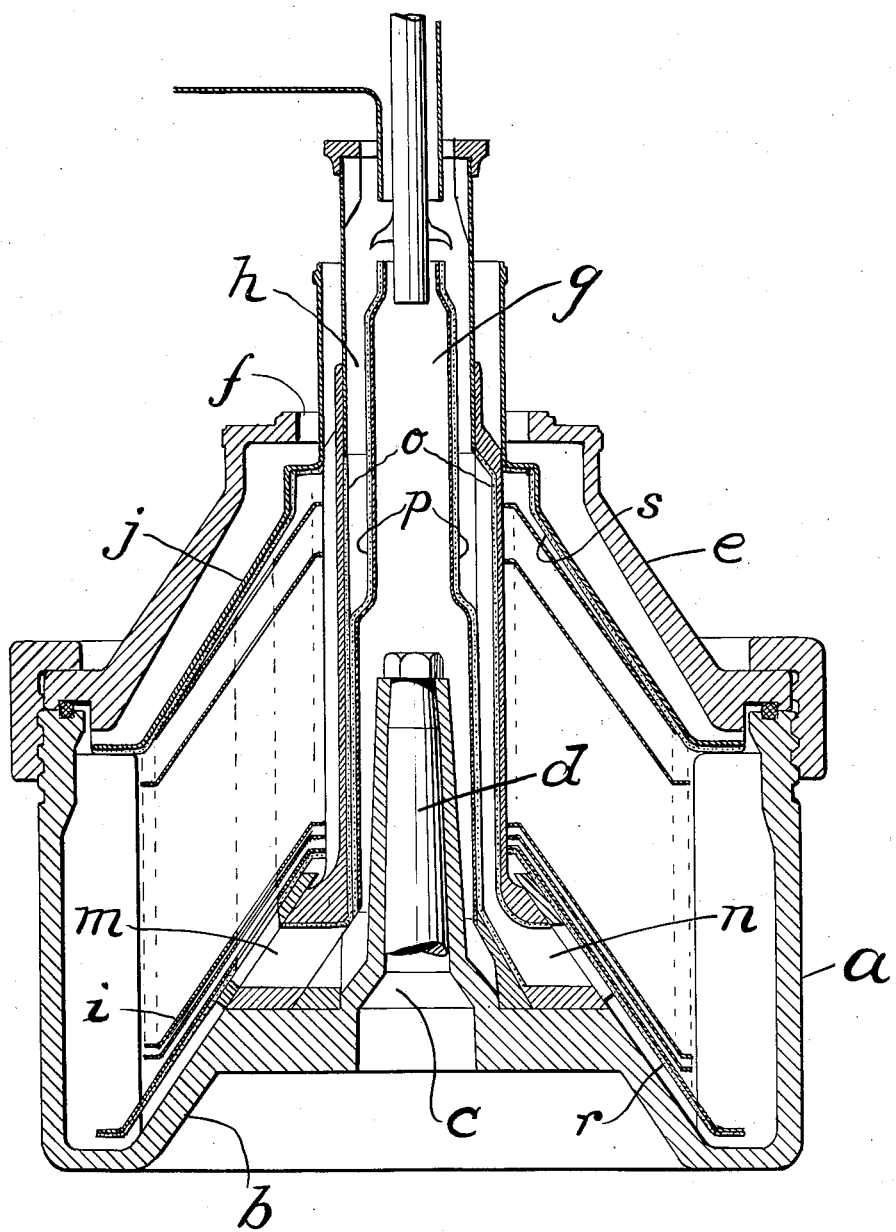

1,571,943

UNITED STATES PATENT OFFICE.

SELDEN H. HALL, OF POUGHKEEPSIE, NEW YORK, AND CYRUS HOWARD HAPGOOD, OF NUTLEY, NEW JERSEY, ASSIGNORS TO THE DE LAVAL SEPARATOR COMPANY, OF NEW YORK, N. Y., A CORPORATION OF NEW JERSEY.

PROCESS OF SEPARATING WAX FROM MINERAL OIL DISTILLATES.

Application filed September 8, 1921. Serial No. 499,325.

*To all whom it may concern:*

Be it known that we, SELDEN H. HALL and CYRUS HOWARD HAPGOOD, citizens of the United States, and residing at Poughkeepsie, county of Dutchess, State of New York, and Nutley, county of Essex, State of New Jersey, respectively, have invented a new and useful Improvement in Processes of Separating Wax from Mineral Oil Distillates, of which the following is a full, clear, and exact description, reference being had to the accompanying drawings, which form a part of this specification.

In the refining of paraffine base crude oil, it is customary to distill off successively products of successively higher boiling points, such as naphtha, illuminating oil, gas oil and wax distillates. These wax distillates, which are particularly adapted for the manufacture of lubricating oils, carry in solution more or less wax (paraffine) whose separation from the oil is necessary or desirable.

It is known to effect the separation of wax from wax distillates by bringing the distillate in heat exchange relation with refrigerated brine for the purpose of throwing the wax out of solution and then separating the wax, which is in crystalline form, from the oil by filtration or settlement. These oil processes are bulk processes, involve the use of large and expensive plants, the handling of a large volume of stock at one time and the expenditure of considerable time. The processes, moreover, are wasteful and the separation by no means thorough. It has not been found possible, however, in any continuous process, to separate the wax from the oil by centrifugation and discharge the wax from the bowl unless naphtha is blended with the distillate. If this is done the wax may be separated from the oil by centrifugation, and the oil and wax separately discharged, but each ingredient carries out with it a large proportion of naphtha and both ingredients must be distilled to drive off the naphtha. This in turn deleteriously affects the color of the treated material, which must be subsequently filtered to decolorize.

The object of the present invention is to devise a process whereby it will be possible, without blending the distillate with naphtha, to centrifugally separate the oil and wax and continuously discharge the wax from the bowl.

A similar problem presents itself in the separation of stearin from oleo. When a solution of oleo and stearin is subjected to a temperature sufficiently low to throw out of solution the stearin in a crystallized condition, it has been found possible to centrifugally separate the two and continuously discharge the stearin from this bowl by introducing into the bowl a heavy cushioning liquid (for example, water) which, in its discharge from the bowl, carries with it the crystallized stearin. Subsequent treatment is required to separate the water and stearin. This may be effected by settlement in a tank in which the stearin rises to the top and continuously overflows, while the water is siphoned off from the bottom by a pipe operating on the principle of a "Florence flask." The overflowing wax carries with it considerable water. The mixture of stearin and water must now be heated and then centrifugally separated.

The present invention is equally applicable to this process in that, without the addition of any heavy liquid that is relied upon for cushioning or sludging purposes, the stearin may be centrifugally separated and continuously discharged.

In carrying out this process we prefer to use a centrifugal machine of the type shown in the patent of Selden H. Hall (one of the co-inventors of the present process) dated April 4, 1922, No. 1,411,782, but for the special purposes of the present process we prefer to modify the specific machine therein shown and accordingly a drawing, illustrating such machine in vertical cross-section, is herewith appended. It will be understood, however, that the execution of the process is not dependent upon the employment of any particular construction of machine. The drawing will first be explained and then the process described.

The bowl shell $a$ has a bottom $b$ with a socket $c$ fitting the driving and supporting spindle $d$. The bowl top $e$ has a discharge outlet $f$ at the upper end. Extending axially of the bowl is a feed tube $g$. Around the feed tube $g$ is an independent feed tube $h$. Within the bowl is a liner $i$ composed of a number of superimposed frustro-conical members, commonly called discs, provided with vertically aligning orifices. Above the liner is a top disc *j* affording a channel for the conveyance of the heavy liquid escaping around its periphery to the outlet *f*. The top disc has a neck up within which the lighter separated ingredients travel to their outlet. The lowest disc of the liner *i* extends out relatively close to the periphery, as does the top disc *j*.

The feed tube *g* terminates in radially extending channels *m* communicating with the sets of orifices in the liner *i*. The feed tube *h* terminates in radially extending channels *n* (closed from communication with channels *m*) opening into the space between the lower disc and the bowl bottom.

Any ingredients fed into the tube *g* will be delivered to the liner orifices and will pass up therein and be distributed between the discs of the liner. Any ingredients fed into the tube *h* will be carried direct to the periphery, and if those ingredients are heavier than the other ingredients and are free-flowing, they will remain at the periphery and travel along the bowl wall to the space above the top disc *j* and thence to the outlet *f*, in accordance with the description in said Hall application.

For the purposes of the present invention the feed passage *h* and channels *n* are heat-insulated from feed passage *g* and from the separating compartment of the bowl. The top disc *j* is also heat-insulated from the separating space of the bowl. This may be accomplished by applying layers of "bakelite", *o* to the inner wall of tube *h*, *p* to the outer wall of tube *g*, *r* to the lower or inner face of the bottom disc of the liner *i*, and *s* to the lower or inner face of the top disc *j*.

The first step in the present process involves subjecting the wax distillate to a temperature sufficiently low to throw the crystalline wax out of solution.

The refrigerated mixture of oil and wax is then fed into the feed tube *g* and discharges through the channels *m* into the lines of orifices in the liner *i*, being thence distributed throughout the spaces between the liners, centrifugal force operating to throw the wax outwardly, while the oil is displaced inwardly.

Simultaneously with the supplying of the mixture to be separated to the bowl, hot water is fed into the feed tube *h* and through the channels *n* is carried to the periphery of the bowl. The water distributes itself over the inner wall of the bowl and constitutes an envelope for the wax which, being lighter than the water, does not penetrate the water but rests against it as a cushion.

The melting points of the various waxes vary from 100° to 160° F. The water should be hot enough to melt the wax having the highest melting point. The temperature of the water should, therefore, be not less than about 160° F. and is preferably about 180° F.

The effect of the envelope of hot water is to melt the layer of wax immediately adjacent thereto so that this wax, in a fluid condition, will flow out with the water, from which it may be separated by gravity or centrifugal force. The oil will flow out of the outlet for the lighter fluid. During the flow of the wax from the separating chamber through the discharge passage above the top disc *j* to the outlet *f*, the wax is maintained fluid by the hot water so that cooling of the wax during its flow through the discharge passage, and consequent partial solidification and clogging, are avoided. As hereinbefore explained, the insulating material applied to the disc *j* prevents any substantial heat exchange between the material in the discharge passage and the material in the separating compartment.

By providing the heat-insulation described, there will be little or no exchange of heat between the water and the mixture of oil and wax during their flow through the feed passages and no exchange of heat between the water and the mixture undergoing separation in the bowl. Further only the outer layer of wax adjacent the water envelope will be melted, the heat not penetrating to the inner layer of wax adjacent the oil to a degree sufficient to melt the inner layer of wax and throw it into solution with the oil.

In applying the process to the separation of stearin from oleo, the mixture should be at a temperature of 90° F. in order to crystallize the stearin. The water should be at a temperature sufficient to melt the outer layer of stearin, which melts at a temperature of 122° F. we prefer a water temperature of about 150° F.

It is apparent that the invention is not limited in its application to the separation of wax from mineral oil wax distillates, nor to the separation of stearin from oleo; these two substances of widely different characteristics being cited merely as examples of useful applications of the process. It is clear that the process is applicable to the separation of any solid from a liquid when the solid is capable of being melted by another heavier liquid immiscible with the solid when melted, or even if miscible therewith if it is desired to form a solution of such heavy liquid and such solid, or if the components of such solution are readily separable by distillation or otherwise.

Nor is our invention limited to the employment of a flowing or traveling envelope of heated heavy liquid. Inasmuch as the water is not utilized for the purpose of providing an agent to sludge out the wax, stearin or other melted ingredient (such ingredient being self-discharging by reason of its liquidity), it is sufficient to surround the mixture of relatively heavy solids and relatively light liquid undergoing centrifugation with a heated envelope that will melt the solid.

Where in the claims we refer to the heavier ingredient thrown out of solution as a "solid" or as "solidified," we use the term in a relative sense as distinguished from an absolute sense, and as comprehending an ingredient sufficiently approximating an absolutely solid condition not to re-dissolve in the lighter liquid ingredient and not to be sufficiently free flowing to avoid building up against the bowl periphery or clogging on the way toward or at the outlet. Further, the words "melt" and "liquefy" are also not used in an absolute sense, but in a relative sense, as intended to define any condition approximating liquidity, which will make the material sufficiently free flowing to slip or slide out of the bowl without building up or clogging. We are aware that it is not new, in the separation of liquids from heavier solids, to utilize a still heavier liquid as a cushioning liquid to carry the solids out of the bowl; but this process is not our process or even an indispensable agent in the execution of our process, which involves an altogether different inventive conception, namely: a different temperature regulation of the solids in the bowl whereby the outer layer of solids is elevated in temperature to the degree required to enable it to readily discharge while the inner layer of solids is maintained at a lower temperature and sufficiently cold to avoid dissolving in the liquid.

Having now fully described our invention, what we claim and desire to protect by Letters Patent is:

1. The process of separating wax from mineral oil wax distillates, after the wax distillate solution has been refrigerated to throw out of solution the wax in crystalline form, which comprises subjecting the mixture of oil and wax to centrifugal force, feeding water of a temperature sufficient to melt wax contacting therewith to the periphery of the mass of the mixture undergoing centrifugation, thereby forming a surrounding envelope of water contacting with and adapted to melt the outer layer of wax, separately discharging the oil and the melted wax and water, and heat insulating the inflowing water and the outflowing wax and water from the mixture of wax and oil.

2. The process of separating two ingredients adapted when mixed at a sufficiently high temperature to form a solution the heavier ingredient of which solidifies upon reduction to a certain temperature, which comprises subjecting the same at a temperature which will maintain the lighter ingredient liquid and the heavier ingredient solid, together with a liquid heavier than and immiscible with the solid and having a temperature above the melting point of the solid, to centrifugal force whereby the constituents will arrange themselves in zones comprising an outer zone of the added heavy liquid, an inner zone of the lighter soluble ingredient and a middle zone of the heavier soluble ingredient, the relatively hot heavy liquid effecting a melting of the adjacent portion of the ingredient of the middle zone, continuously inflowing said ingredients, continuously discharging the hot heavy liquid and the melted ingredient together and floating off separately the lighter ingredient, and maintaining the hot heavy liquid out of heat-exchange relation with said lighter cold ingredient so that no portion of the heavier soluble ingredient mixed or contacting with said lighter ingredient will pass into solution therewith during the separating operation.

3. The process of separating two ingredients the heavier ingredient of which solidifies at a higher temperature, a mixture of which has been subjected to a temperature which will maintain the lighter ingredient liquid and the heavier ingredient solid, which comprises subjecting said ingredients to the action of centrifugal force to effect a separation of the two ingredients, feeding a liquid heavier than either of said ingredients to the periphery of the mass of the mixture undergoing centrifugation and forming an envelope of such heavy liquid surrounding the solid, maintaining said heavy liquid at a temperature sufficient to melt the outer layer of solids while not sufficient to melt the inner layer of solids, and separately outflowing the light liquid and said melted solid.

4. The process of separating two ingredients the heavier of which solidifies at a higher temperature, a mixture of which has been subjected to a temperature which will maintain the lighter ingredient liquid and the heavier ingredient solid, which comprises subjecting said ingredients to the action of centrifugal force to separate them into an inner zone of the light ingredient and an outer zone of the heavier ingredient, and surrounding the zone of the heavier ingredient with a heated envelope adapted to liquefy its outer layer, and separately discharging the lighter ingredient and the thus liquefied portion of heavier ingredient.

In testimony of which invention, we have hereunto set our hands, at New York, on this 2nd day of September, 1921.

SELDEN H. HALL.
CYRUS HOWARD HAPGOOD.